Patented June 25, 1935

2,006,086

UNITED STATES PATENT OFFICE 2,006,086

METHOD OF CARRYING OUT OXIDATIVE FERMENTATIONS BY MOLDS OR FUNGI

Orville E. May, Chevy Chase, Md., Horace T. Herrick, Washington, D. C., Andrew J. Moyer, Takoma Park, Md., and Percy A. Wells, Ballston, Va., assignors to Henry A. Wallace, Secretary of Agriculture of the United States of America No Drawing. Application August 24, 1934, Serial No. 741,294

6 Claims. (Cl. 260—120)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

Our invention relates to the method of carrying out oxidative fermentations of carbohydrates by fungi or molds, growing in a submerged condition, under pressures greater than atmospheric.

By oxidative fermentations we mean reactions, in which oxygen is one of the reactants required, in order to form the characteristic products resulting from such fermentations.

Fungi when employed industrially, as in the production of gluconic acid or citric acid, have usually been utilized as a pellicle or mat of mycelium growing on the surface of the nutrient medium. On the other hand, when it is wished to utilize the hydrolytic enzymes of these organisms in industrial processes, as in the amylo process, for the manufacture of industrial alcohol, or in the manufacture of gallic acid by the hydrolysis of tannin extracts, it has been found possible to employ submerged growths of molds, which are obtained by agitating and aerating the medium so that the organism is compelled to grow throughout the medium. (D. R. P. #129,164, March 1, 1902). The accomplishment of certain oxidative fermentations by submerged mold growth has been recorded in the biochemical literature. Thus Amelung in 1930 Chemiker Zeitung vol. 54, pg. 118 reported the production of citric acid from sucrose by aerating submerged growths of certain species of Aspergillus. Schreyer in 1928 Biochemische Zeitschrift vol. 202, pp. 136, 146, and Thies in 1930 Zentrallblatt fur Bakteriologic etc. Abt. II, vol. 82, pg. 342 demonstrated that gluconic acid could be produced in appreciable yields from sucrose by submerged cultures of certain species of Aspergillus through which air or oxygen was bubbled, the conditions being a combination of aeration and agitation. More recently, Currie, Kane, and Finlay have obtained a patent (U. S. 1,893,819 (1933) in which the novel features consist of high speed agitation, the mixing of large quantities of air with the culture liquid, and the production of gluconic acid or salts of gluconic acid from glucose by submerged mold growth in the foamy liquid so formed.

Our invention differs from the foregoing teachings in that we have found that by treating a nutrient liquor, containing various organic or inorganic constituents, along with varying concentrations of glucose, with spores or mycelial fragments of molds or fungi, and maintaining the culture liquid under pressures of gases, containing substantial quantities of oxygen, such as air, above that of the atmosphere, and at the same time agitating the solution by bubbling air through it, the yields of compounds produced by the oxidation of the glucose are greatly increased, and the fermentation time decreased over those carried out at atmospheric pressure, but otherwise under identical conditions. This is more fully illustrated by the following examples, showing practical methods for practicing our invention.

Examples

I. 200 cc. of 20% commercial glucose solution containing nutrient salts was placed in a type 101a Jena gas washing bottle of a capacity of 500 cc. Chips of porous plate were then added in a volume equivalent to approximately ½ that of the solution. After sterilization the solution was inoculated with spores of a selected strain of Aspergillus flavus and the bottle was then placed in a constant temperature autoclave so fitted that the air contained therein under constant pressure was vented at a measured rare through the solution in the gas washing bottle. After a fermentation period of 14 days at a gauge pressure of 10 pounds the contents of the bottle were analyzed.

8.96 gms. kojic acid were produced, equivalent to a theoretical yield of 28.4%.

II. The same conditions were used as in Example I, except that a gauge pressure of 20 pounds was maintained and the duration of the fermentation period was lowered to 10 days.

9.30 gms. of kojic acid were produced, equivalent to a theoretical yield of 29.5%.

III. The same apparatus was used as in Examples I and II. 200 cc. of 20% commercial glucose solution containing slightly different quantities of nutrient salts, together with the chips of porous plate, was used and was inoculated with spores of a selected strain of Penicillium chrysogenum, a gluconic acid producing organism. The gauge pressure of air within the autoclave was maintained at 22.5 pounds. The duration of the fermentation period was 10 days.

The gluconic acid yield obtained was equivalent to 36.8% of theory based on the glucose present in the nutrient solutions.

IV. The same general procedure was followed as obtained above, except that the use of chips of porous plate was eliminated. In addition 10 gms. of CaCO₃ was added to the solution and the gauge pressure of air was held at 30 pounds. The duration of the experiment was 8 days.

A gluconic acid yield equivalent to 82.4% of theory was obtained.

V. The same conditions in this experiment obtained as in Example IV, except that the gauge pressure was increased to 60 pounds and the duration of the fermentation period was shortened to 6 days.

A gluconic acid yield was obtained equivalent to 66.1% of theory.

VI. The same conditions were used in this experiment as were employed in Example V, except that the duration of the fermentation period was 8 days.

A yield of gluconic acid was obtained equivalent to 86.1% of theory.

While we have set forth in the foregoing examples the preferred methods of practicing our invention, we do not wish to be restricted to them, or to any particular apparatus.

Having thus described our invention, what we claim for Letters Patent is:

1. A process for carrying out oxidative fermentations of glucose by submerged growths of fungi under superatmospheric pressure of gases containing substantial quantities of oxygen.

2. A process for carrying out oxidative fermentations of carbohydrates by submerged growths of molds under superatmospheric pressure of gases containing substantial quantities of oxygen.

3. A process for the manufacture of kojic acid from glucose by submerged growths of kojic acid generating molds acting under superatmospheric pressure of gases containing substantial quantities of oxygen.

4. A process for the manufacture of kojic acid from carbohydrates by submerged growths of kojic acid generating molds acting under superatmospheric pressure of gases containing substantial quantities of oxygen.

5. A process for the manufacture of gluconic acid comprising forming a solution of glucose and nutrient substances, supplying a gluconic acid generating mold, maintaining aeration and agitation such as to disperse the growing mold and oxygen through the solution, the while maintaining the same under superatmospheric pressure of gases containing substantial quantities of oxygen.

6. A process for the manufacture of gluconic acid comprising forming a solution of carbohydrates and nutrient substances, supplying a gluconic acid generating fungi, maintaining aeration and agitation such as to disperse the growing fungi and oxygen through the solution, and at the same time maintaining the solution under superatmospheric pressure of gases containing substantial quantities of oxygen.

ORVILLE E. MAY.
HORACE T. HERRICK.
ANDREW J. MOYER.
PERCY A. WELLS.